United States Patent [19]
von Haas et al.

[11] Patent Number: 4,981,057
[45] Date of Patent: Jan. 1, 1991

[54] CLAMPING DEVICE FOR CONNECTING A TOOL HEAD TO A TOOL HOLDER OF A MACHINE TOOL

[75] Inventors: Rainer von Haas, Geesthacht; Günter Ruther, Marl, both of Fed. Rep. of Germany

[73] Assignee: Krupp Widia GmbH, Essen, Fed. Rep. of Germany

[21] Appl. No.: 424,057

[22] Filed: Oct. 19, 1989

[30] Foreign Application Priority Data

Oct. 31, 1988 [DE] Fed. Rep. of Germany ....... 3837007

[51] Int. Cl.$^5$ ............................................. B23B 29/12
[52] U.S. Cl. ...................................... 82/160; 82/158; 409/234; 407/101; 279/72
[58] Field of Search ................. 82/158, 159, 160, 161; 409/234, 233; 279/72, 75, 81, 82; 407/101

[56] References Cited

U.S. PATENT DOCUMENTS

| | | | |
|---|---|---|---|
| 2,539,045 | 1/1951 | Waring | 279/72 |
| 4,626,146 | 12/1986 | Neumaier | 279/81 |
| 4,671,718 | 6/1987 | Eakin | 81/177.85 |
| 4,726,268 | 2/1988 | Erickson | 82/160 |
| 4,726,269 | 2/1988 | Erickson | 82/160 |
| 4,736,659 | 4/1988 | Erickson | 82/158 |
| 4,747,735 | 5/1988 | Erickson et al. | 409/234 |
| 4,775,269 | 10/1988 | Brix | 279/81 |

FOREIGN PATENT DOCUMENTS

| | | |
|---|---|---|
| 2063186 | of 1972 | Fed. Rep. of Germany . |
| 2736412 | 3/1978 | Fed. Rep. of Germany ........ 82/160 |
| 3302247 | 7/1987 | Fed. Rep. of Germany . |
| 3410154 | 6/1989 | Fed. Rep. of Germany . |
| WO88/05358 | 7/1988 | PCT Int'l Appl. . |

OTHER PUBLICATIONS

G. Niemann, Maschinen-Elemente, Band I, Konstruktion und Berechnung von Verbindungen, Lagern, Wellen Springer-Verlag Berlin, Heidelberg, New York 1981.

Primary Examiner—Frederick R. Schmidt
Assistant Examiner—Blynn Shideler
Attorney, Agent, or Firm—Herbert Dubno

[57] ABSTRACT

A tool head is clamped in a tool holder by rotating a radial or axial clamping shaft which has spiral camming surfaces urging clamping elements outwardly to engage ramps on the pin of the tool head which is received in a socket of the tool holder. The spiral cam can be a second or higher order mathematical curve and the shaft can carry an ejection cam as well.

12 Claims, 5 Drawing Sheets

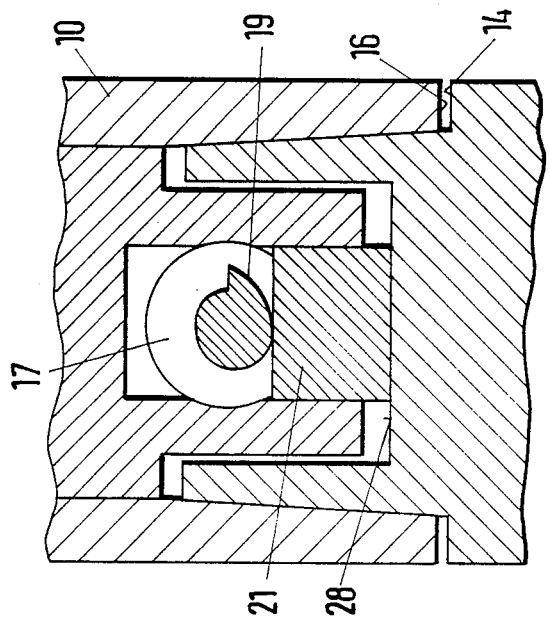
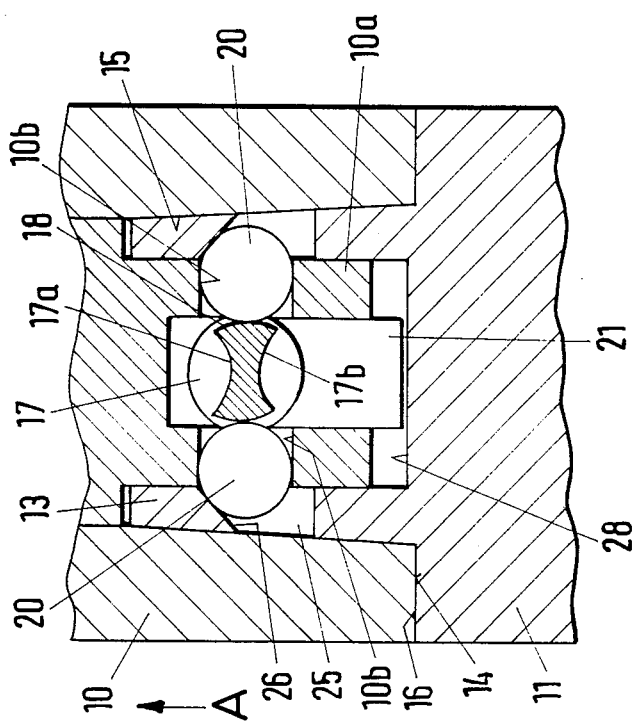

CLAMPING DEVICE FOR CONNECTING A TOOL HEAD TO A TOOL HOLDER OF A MACHINE TOOL

FIELD OF THE INVENTION

Our present invention relates to a clamping device for clamping a tool head, e.g. of a cutting or turning tool, to the tool holder of a machine tool and, more particularly, to a device of this kind in which the tool head has a cylindrical or slightly tapered frustoconical projection receivable in a complementary socket in which the clamping device engages the tool head.

BACKGROUND OF THE INVENTION

It is known to provide a clamping device for connecting a tool head to a tool holder on a machine tool so that the tool is interchangeably mounted in the holder by providing the holder with a bore or socket which can be cylindrical or slightly tapered and frustoconical, and into which a projecting portion or pin of the tool holder engages. The tool holder and the tool head are further connected by an actuatable clamping element which, during the clamping action moves from an inner position to an outer position into recesses in the tool head to so lock the tool head in the holder. Such a clamping arrangement provides a force-fitting and form-fitting connection between the tool head and the tool holder.

In German Pat. No. 30 07 440, for example, a tool clamping device is described in which the tool holder is provided with a clamping element movable with a predetermined stroke and which engages radially outwardly effective clamping pins. The latter engage in recesses in the tool carrier to arrest the latter in the holder.

In German Pat. No. 36 02 247, there is described a further clamping device of this type in which a clamping slide is movable in the longitudinal direction of the tool holder and has at its end face a formation which cooperates with the planar surface of a blind bore in the tool head and wherein, in the forward part of the latter, radially movable clamping jaws are provided which cooperate with a pin fixed in the tool holder so that, upon shifting of the jaws against the pin, the latter engages in a groove in the receiving bore of the tool head and locks the tool head in a position in which a shoulder thereof lies against a countersurface or shoulder of the tool holder.

U.S. Pat. No. 4,747,735 discloses a clamping device with a clamping pin by means of an axial shifting of which, clamping bores can be moved radially outwardly. This system operates in principle in manner as the system described in German Pat. No. 30 07 440 to allow the balls to engage in recesses in the tool carrier and to arrest the latter in the housing.

Other patent documents utilize helical or screwthread arrangements to effect a clamping action. These documents include patent cooperation treaty application PCT/US87/02976 filed Nov. 13, 1987 and published July 28, 1988 as WO88/05358. In German Pat. No. 34 10 154, another system basically similar to the pin in drive arrangement utilizing a linearly displaceable camming surface is described. In this case as well, a screwthread arrangement is provided.

In German Patent Document 20 63 186 a powered clamping device engaging a finger behind which the clamp grips, is described.

Independently of the clamping elements used in these state of the art systems, a linear movement is converted into an inclined displacement or a screw or helical arrangement is employed. With a comparatively short clamping stroke, it is possible with these systems to generate high clamping forces, although comparatively complex, expensive or engaging means may be required to maintain the high clamping force. With respect to screwthread arrangements, the angular displacement must be considerable for a limited axial displacement or effect and this may not always be desirable.

Furthermore, especially in the case of screwthread arrangements inordinate amounts of play may be provided.

By and large, therefore, existing clamping devices for the tool head or carrier in a tool holder of a machine tool has not always been satisfactory heretofore.

OBJECTS OF THE INVENTION

It is, therefore, the principal object of the present invention to provide an improved clamping device which is of substantially simpler construction than earlier devices and which nevertheless will provide a more reliable clamping of the tool in the holder.

Another object of this invention is to provide a clamping device for the purposes described which will have a minimal clamping displacement and thus will permit the clamping action to become more effective in a shorter period of time than is the case with earlier systems.

Yet a further object of the invention is to provide a clamping device which can be combined in an effective way with an ejection facility to enable the device, upon release of the clamping force, to eject the tool carrier from the tool holder and thereby facilitate replacement of the tool carrier.

Still another object of the invention is to provide a clamping device having the advantages reflected by the other objects set forth herein but in which the higher clamping or ejection forces are applied with small displacements of the clamping element when the tool carrier has reached its clamping position in the tool holder or has not yet been displaced out of this position, respectively.

SUMMARY OF THE INVENTION

These objects and others which will become apparent hereinafter are attained, in accordance with the present invention in a clamping system of the general type described previously wherein the tool carrier has a tool head with a rotationally symmetrical (cylindrical or at least partially conical) pin or shank receivable in a corresponding socket in the tool holder and a clamping actuator actuates clamping elements which, upon clamping, are moved outwardly into recesses in the tool carrier to solock the latter in the holder that a force-fitting and form-fitting connection between the tool head and the tool holder is achieved.

According to the invention, the clamping actuator is a rotatable clamping shaft with a spirally extending guide for each of the clamping elements. Advantageously, this clamping actuator can be used for all of the clamping systems which employ outwardly displaceable elements and to great advantage over earlier actuators since only a short clamping displacement is required, thereby limiting the time in which the tool carrier can be clamped in the holder.

Tool replacement can be carried out at exceptionally high speed and hence the economic value of the clamping device is enhanced.

It is important to distinguish the spirally running guide from a helical system utilizing screwthreads or the like. In a spiral camming surface, the point of engagement of the camming surface with the actuated element varies with respect to its distance from the axis of the shaft upon rotation of the shaft. With such a camming surface, relatively high speed displacements can be provided until the tool carrier is seated against the tool holder and within the latter and with a lesser rate of rise of the camming surface per unit of angular displacement of the shaft, especially high clamping forces can be provided with small displacements.

According to a feature of the invention, the camming guide is formed by a spiral clamping track in the form of a groove formed in the shaft.

Since, after a machining operation, the tool head may be so firmly seated in the tool holder that it effectively is self clamping therein, we can provide a so-called ejection element to release the tool head.

In the past, ejection elements were usually displaced by hydraulic cylinders which press the ejection element against a corresponding counter surface of the tool head. However, in accordance with a feature of the invention, the clamping shaft is so formed that it carries a second or further spiral like guide forming the ejection element. This also greatly simplifies the decoupling operation.

The clamping shaft can be received in a radial or axial bore of the tool holder and permits a comparatively short construction of the tool holder to be realized. Retention against undesired rotation of the shaft can be provided by O-rings interposed between the clamping shaft and the wall of a corresponding bore of the tool holder. The O-rings are preferably formed from an elastomer.

It has been found to be advantageous, in minimizing the clamping time, to provide the camming or track guide so that the clamping angular displacement of the shaft is from 20° to 160° and preferably is about 90°. The clamping angular or clamping displacement as these terms are used herein, should be understood to mean the angular about which the clamping shaft is rotated to clamp the tool carrier or to release the latter. The camming guide surface or track formed along the periphery of the shaft will have a corresponding length.

According to another feature of the invention, the spiral is a continuous space curve of second or higher mathematical order whose rise, with respect to angular displacement drops off at a continuous rate, preferably exponentially or logarithmically. Alternatively, the guide spiral is formed as a hyperbolic or logarithmically line or curve in space.

The aforedescribed configurations of the camming surface insure that, over initial brief rotation of the shaft, the greatest rise of the camming surface will rapidly displace the camming elements outwardly and against the tool head while the subsequent, somewhat flatter parts of the camming surface can generate the high clamping forces which are required. The same principle applies to the ejection in reverse since the initial relatively shallow rise can generate the high forces needed at the second or further spiral to overcome the self-adhesion forces while the greater rise can then come into play to displace the tool carrier rapidly from the tool holder.

The clamping elements are preferably balls, jaws or pins. These clamping elements can be displaced by the shaft into bores or in annular groove in the pin of the tool head. The clamping shaft is actuated from the exterior of the holder.

More specifically, the tool assembly for a machine tool according to the invention can comprise:

a machining tool having a tool carrier formed with a tool head having a pin of the configuration of a body of revolution;

a tool holder formed with a socket of a configuration complementary to that of the pin and adapted to receive the pin and form a force-fitting and form-fitting connection therewith;

a plurality of clamping elements on the holder displaceable outwardly into respective recesses formed in the tool carrier and actuatable to displace the tool carrier into the connection with the holder, thereby locking the tool carrier to the holder; and an actuator on the tool holder in the form of a rotatable clamping shaft provided with spiral camming guides bearing upon the elements and having regions of engagement therewith at distances from an axis of the shaft varying with angular displacement thereof.

BRIEF DESCRIPTION OF THE DRAWING

The above and other objects, features and advantages of my invention will become more readily apparent from the following description, reference being made to the accompanying highly diagrammatic drawing in which:

FIG. 2 is a partial section along the line II—II of FIG. 1;

FIG. 3 is a partial section along the line III—III of FIG. 1;

SPECIFIC DESCRIPTION

Figure 1:
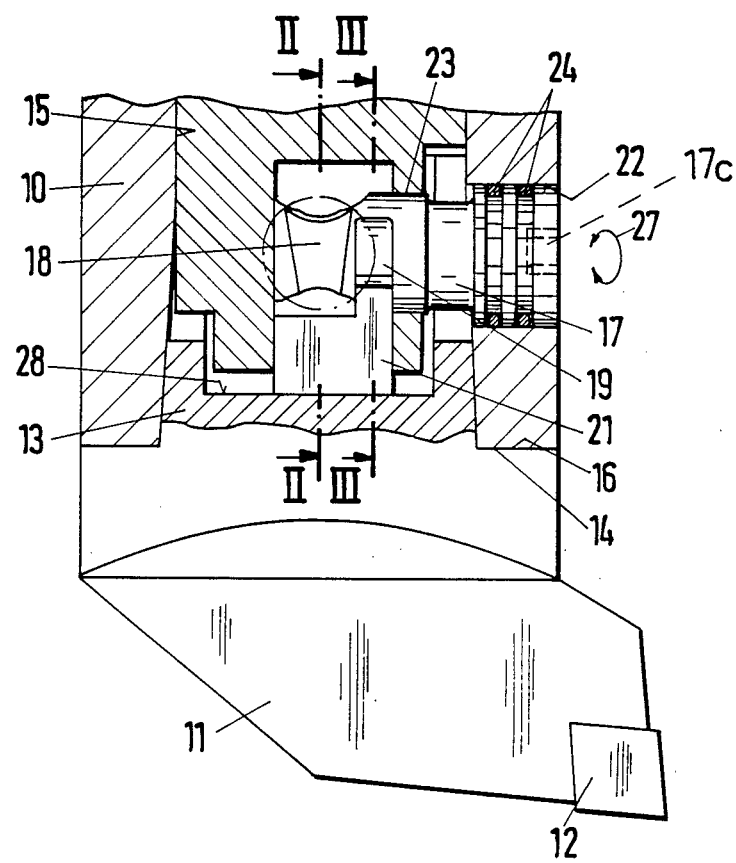
FIG. 1 is a diagrammatic cross sectional view through the tool assembly of the invention illustrating the position of the generally radial clamping shift in the assembly.

The tool head 11 shown in FIG. 1 is inserted by a gripper mechanism (not shown) automatically after withdrawal from a tool magazine, into a tool holder 10 of a machine tool.

The tool head 11 has a pin 13 which can be rotationally symmetrical, e.g. where cylindrical or frustoconical, and which is received in a complimentarily shaped socket or bore 15 of the tool holder 10.

In the clamped state (see FIGS. 1 and 2), the annular shoulder 14 of the tool head 11 will abut the annular counter surface or shoulder 16 of the tool holder 10 and a form and force fitting relationship is provided between the holder and the tool carrier. In the illustrated embodiment the tool head 11 is formed with a cutting tool illustrated as a turning plate 12. The tool holder can be the tool holder of a lathe or similar machine tool.

In this embodiment, the clamping actuator is rotatable as represented by the double-headed arrow 27 (FIG. 2) and comprises a clamping shaft 17 formed with a pair of partially cylindrical or spherical recesses 17a and 17b into which a pair of balls can recede inwardly when the shaft 17 is rotated about its axis through 90° from the position shown in FIG. 2. With the balls 20 in the receded position, the pin 13 can clear the balls and be inserted into the socket 15.

The shaft 17 is rotatable in a stem 10a of the holder which has a pair of bores 10b accommodating the balls 20.

In addition, the shaft 17 has along its periphery a spiral like clamping track or groove 18 forming the spiral cam previously described.

Figure 3A:
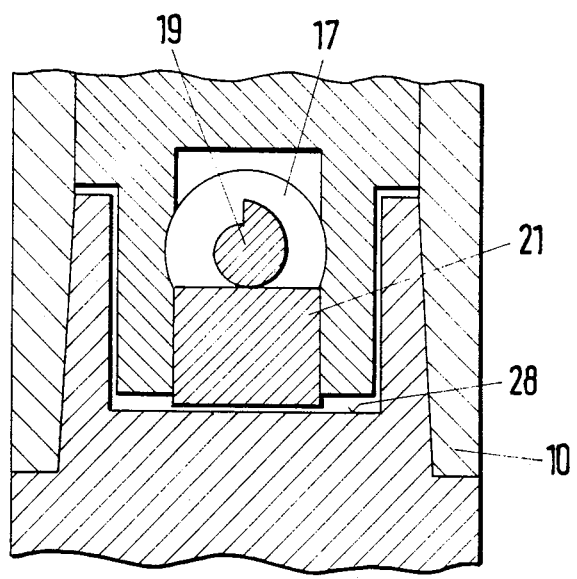
FIG. 3a is a view similar to FIG. 3 but illustrating the second cam thereof, namely, the ejection cam, in the position of the shaft corresponding to the shaft position of FIG. 2.

As is apparent from FIGS. 1, 3, and 3a, the shaft 17 also includes a spiral like guide 19 forming an ejector acting upon an ejection element 21 which can bear against the surface 28 of the tool head 11.

The shapes of the spiral cams are best seen in FIGS. 2 and 3 in which the spiral cam 19 can be seen to have the shape of an Archimedean spiral but, like the spiral surface 18, can have a curve of second or higher order in a mathematical sense.

In either case, the cam has a sharp rise, i.e. rate of increase of the distance from the center at the point of contact with the cammed element per unit of rotation of the shaft and followed by a somewhat flatter portion or a portion of reduced rise.

For the clamping action, therefore, there is an initial rapid displacement of the tool carrier into the tool holder 10 followed by a high force application as the reduced rise portion of the spirals 18 come into play. Conversely, for rejection on rotation of the shaft 17 in the opposite sense, an initial high force application is provided to break the adhesion of the tool head in the holder and the high rise portion of the cam 19 then acts to rapidly displace the tool carrier out of the tool holder.

As can be seen from FIG. 2, the balls 20, upon being urged outwardly, enter corresponding bores 25 in the pin 13 which is formed as a sleeve, and brace against inclined surfaces or ramps 26. As the balls are cammed outwardly, therefore, they exert an axial force upon the ramp in the direction of arrow A in FIG. 2 to tighten the tool carrier in the tool holder. The engagement of the balls with the ramps 26 is a low friction engagement.

The clamping shaft 17 itself, as is apparent from FIG. 1, is rotatable in radial bores 22 of the tool holder 10 on the one hand and 23 in the stem 10a on the other. The free rotation of the shaft is prevented by friction applied via O-rings 24 composed of an elastomer and not positioned between the shaft and the wall of the bore receiving same.

The clamping angular displacement as illustrated is about 90° and once the balls 20 begin to pass into the recesses 17a and 17b, the cam 19 becomes effective (compare FIGS. 3a and 3b) to eject the tool carrier with the reversing angular displacement of also about 90°.

The clamping device, therefore, operates as follows:

With the shaft 17 in a position rotated through 90° from the position shown in FIG. 2, the tool carrier 11 is inserted into the holder 10 to align the bores 25 generally with the balls 20, the latter being received in the recesses 17a and 17b. As the shaft 17 is rotated, the clamping elements 20 are displaced from their rest positions and are engaged by the camming surfaces 20 to press against the ramps 26 and rapidly draw the tool head 11 into the socket of the tool holder 10. At the moment at which the displacement of the head 11 in the direction of the tool holder begins, the surface 28 presses the ejection element 21 toward the axis of the shaft as is permitted by the reverse spiral 19 (see FIG. 3). A further rotation clamps the tool carrier in the tool holder with increasing force in the manner described. A reverse rotation of the shaft 17 results in an opposite action, first relaxing the force with which the balls 20 press on the ramp 19 and then allow the shallow surface of cam 19 to break the adhesion of the tool head 11 in the holder 10 so that the balls can recede and the cam 19 can eject the tool holder. The ejection movement results from the displacement of member 21 by the cam 19 against the surface 28. The tool is then displaced with increasing speed from the holder. This movement corresponds to a rotation of the shaft 17 in the counter clockwise since from the position shown in FIG. 3a to the position shown in FIG. 3, for example.

Apart from the radial orientation of the actuating shaft 17 illustrated in connection with FIGS. 1 through 3a, an axial orientation of the clamping shaft is possible as has been illustrated in FIGS. 4 through 7 by way of example.

In FIG. 1, we have also shown a socket 17c in the shaft 17 which can be a hexagonal socket adapted to receive a hexagonal wrench for rotating the shaft from the exterior of the hole.

Figure 4:
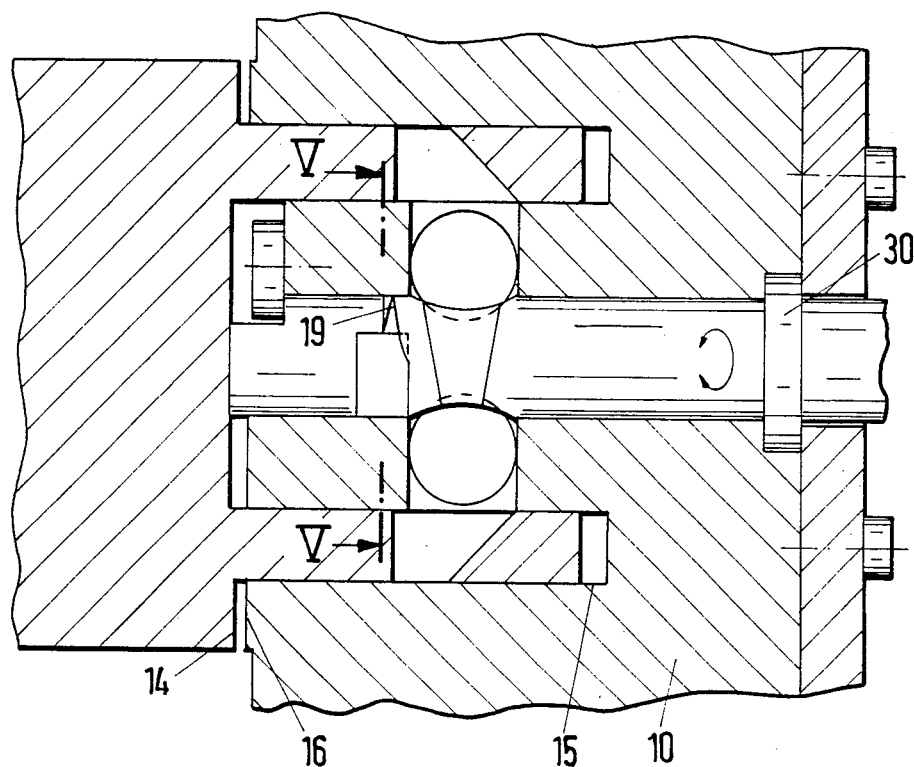
FIG. 4 is a section through a tool assembly with a clamping device of the invention in an axial configuration.

FIG. 4 shows an annular shoulder 14 of the tool head engageable with an annular counter surface or planar abutment 16 of the tool holder 10. To prevent an axial displacement or shifting of the rotatable clamping shaft 17, an annular flange 30 is provided and is trapped by the tool holder 10 against axial displacement.

The ejecting spiral 19 is provided on an end fashion of the clamping shaft 17. The balls here are also held in bores of the tool holder which only permit a radial movement of the balls. As contrasted with frustoconical configurations of the pin of the tool head, the pin in this embodiment is cylindrical.

Figure 5:
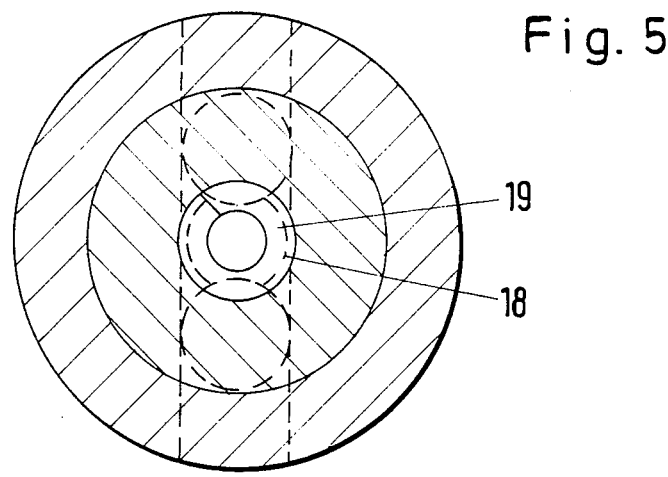
FIG. 5 is a section taken along the line IV-IV of FIG. 4.

FIG. 5 shows a section through the device head of the ejection spiral 19 and also illustrates in broken lines the orientation of the spiral camming guides 18.

Figure 6:
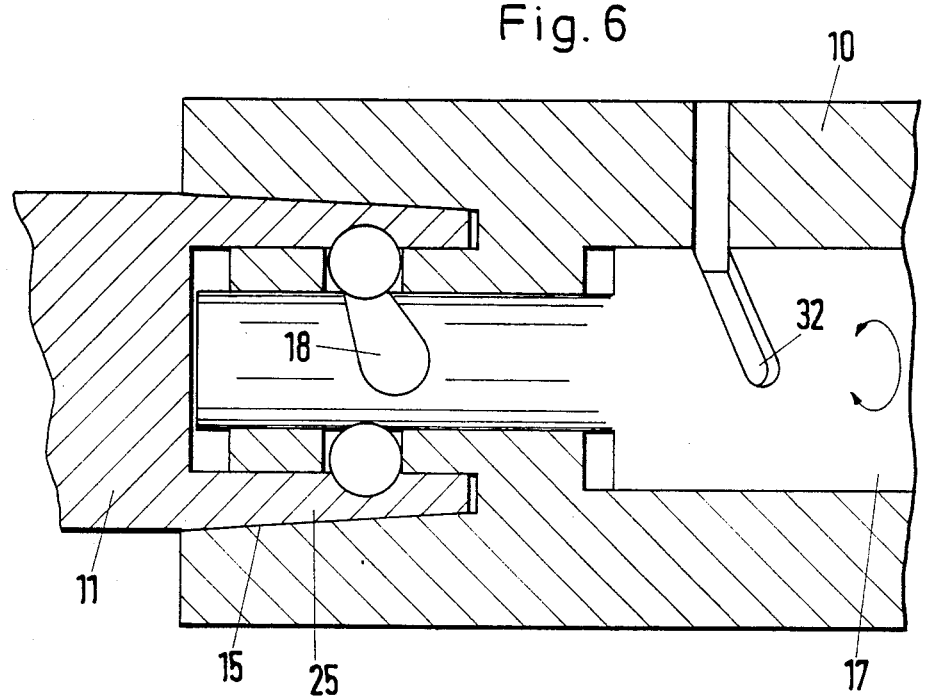
FIG. 6 is a section through an axial clamping actuator having a clamping track formed with a space curve and balls as clamping elements.

The clamping shaft shown in FIG. 6 has a camming spiral guide 18 in the form of a space curve. To prevent the loading of the shaft during clamping or release action by additional axial forces, a forced guide 32 is provided. In this embodiment the ejection element can be eliminated as a separate spiral since axial displacement of the shaft 17 is effective for the displacement purposes and can have its end engage the tool head 11 directly.

The bores 25 in the embodiment of FIG. 6 are inclined to provide the camming action of the balls against the tool head 11. The tool head 11 need not be, in this case, an annular countersurface for abutment with the holder but can be tapered as shown in FIG. 6.

Figure 7:
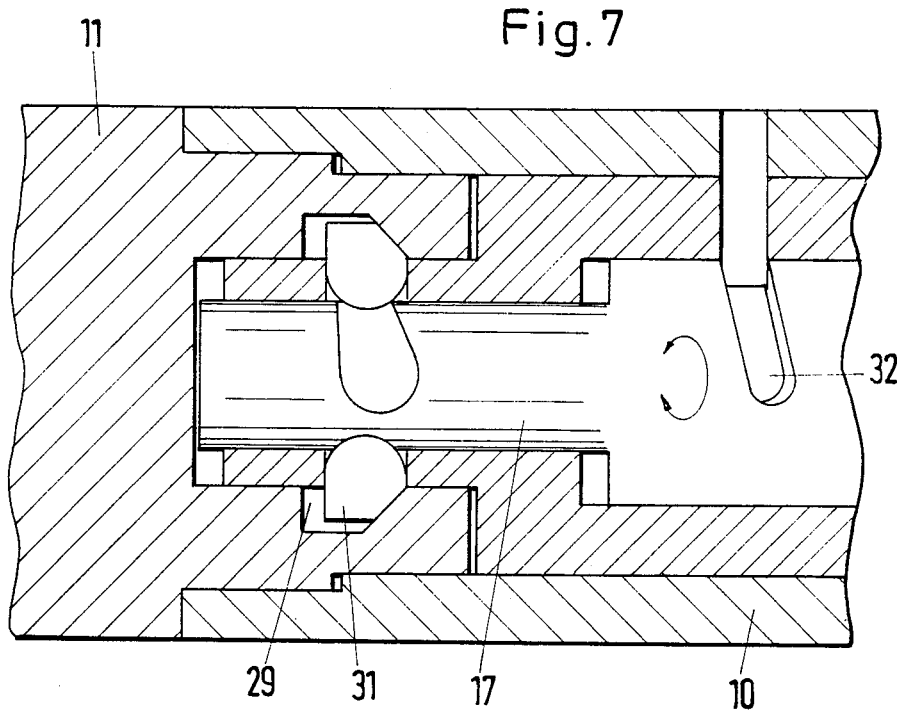
FIG. 7 is a section through a clamping device generally similar to FIG. 6 but using clamping jaws instead of balls.

FIG. 7 shows an embodiment of the invention in which the clamping elements 31 are clamping jaws which can engage in an annular groove 29 of the tool head 11.

The clamping elements can also be clamping pins if desired.

The tool head pin itself is here formed as a stepped cylinder. The embodiments of FIGS. 4 through 7 function similarly to the embodiment of FIGS. 1 through 3a.

We claim:

1. A tool-clamping assembly for a machine tool comprising:
    a machining tool having a tool carrier formed with a tool head having a pin of the configuration of a body of revolution;
    a tool holder formed with a socket of a configuration complementary to that of said pin and adapted to receive said pin and form a force-fitting and form-fitting connection therewith;
    two clamping elements in the form of balls on said holder displaceable outwardly into respective recesses formed in said tool carrier and actuatable to displace said tool carrier into said connection with said holder, thereby locking said tool carrier to said holder; and
    an actuator on said tool holder in the form of a rotatable clamping shaft provided with two spiral camming guides in the form of spiral grooves receiving said balls and respectively bearing outwardly upon said balls and having regions of engagement therewith at distances from an axis of said shaft varying with angular displacement thereof, said spiral camming guides being defined by continuous smooth space curves of second or higher order and whose rise continously and smoothly decreases with angular position around said axis, said balls being guided in respective bores in said tool carrier inclined to an axis of said tool holder.

2. The tool-clamping assembly defined in claim 1 wherein said spiral camming guides are defined by continuous logarithmic curves.

3. The tool-clamping assembly defined in claim 1, further comprising a further spiral-like guide on said shaft engaging said head and forming an ejector displacing said head from said holder upon rotation of said shaft upon release of said head by said elements.

4. The tool-clamping assembly defined in claim 1 wherein said clamping shaft is received in a radial bore formed in said holder.

5. The tool-clamping assembly defined in claim 1 wherein said clamping shaft is received in an axial bore formed in said holder.

6. The tool-clamping assembly defined in claim 1, further comprising O-rings retaining said shaft relative to said holder.

7. The tool-clamping assembly defined in claim 6 wherein said O-rings are composed of an elastomer.

8. The tool-clamping assembly defined in claim 1 wherein said shaft has a clamping angular displacement in said holder of 20° to 160°.

9. The tool-clamping assembly defined in claim 8 wherein said clamping angular displacement is 90°.

10. The tool-clamping assembly defined in claim 1 wherein said spiral camming guides are defined by continuous hyperbolic curves.

11. The tool-clamping assembly defined in claim 1 wherein said rise decreases logarithmically.

12. The tool-clamping assembly defined in claim 1 wherein said rise decreases exponentially.

* * * * *